US008387115B2

(12) United States Patent  
Park

(10) Patent No.: US 8,387,115 B2
(45) Date of Patent: Feb. 26, 2013

(54) ACTIVE ACCESS CONTROL SYSTEM AND METHOD

(75) Inventor: Joon S. Park, Jamesville, NY (US)

(73) Assignee: Syracuse University, Syracuse, NY (US)

(*) Notice: Subject to any disclaimer, the term of this patent is extended or adjusted under 35 U.S.C. 154(b) by 489 days.

(21) Appl. No.: 12/388,252

(22) Filed: Feb. 18, 2009

(65) Prior Publication Data

US 2009/0235334 A1    Sep. 17, 2009

Related U.S. Application Data

(60) Provisional application No. 61/066,566, filed on Feb. 21, 2008.

(51) Int. Cl.
    *G06F 7/04* (2006.01)
(52) U.S. Cl. .......................................................... 726/3
(58) Field of Classification Search ........................ 726/3
    See application file for complete search history.

(56) References Cited

U.S. PATENT DOCUMENTS

| 7,086,085 | B1 * | 8/2006 | Brown et al. ...................... 726/7 |
| 7,725,732 | B1 * | 5/2010 | Ballard .......................... 713/186 |
| 2005/0125674 | A1 * | 6/2005 | Nishiki et al. ................ 713/182 |
| 2005/0138061 | A1 * | 6/2005 | Kuehr-McLaren et al. .. 707/102 |
| 2005/0138419 | A1 | 6/2005 | Gupta et al. |
| 2006/0200856 | A1 * | 9/2006 | Salowey et al. .................... 726/5 |
| 2008/0016580 | A1 | 1/2008 | Dixit et al. |
| 2008/0072290 | A1 * | 3/2008 | Metzer et al. ...................... 726/3 |
| 2009/0158425 | A1 * | 6/2009 | Chan et al. ...................... 726/21 |

OTHER PUBLICATIONS

International Searching Authority, Notification of Transmittal of the International Search Report and the Written Opinion of the International Searching Authority, or the declaration, dated Jul. 22, 2009, (4 pages).
International Searching Authority, International Search Report, dated Jul. 22, 2009, (3 pages).
International Searching Authority, Written Opinion of the International Searching Authority, dated Jul. 22, 2009, (4 pages).
International Bureau, Notification Concerning Transmittal of International Preliminary Report on Patentability, dated Sep. 2, 2010, (6 pages).
Mohammad A. Al-Kahtani et al. 'A Model for Attribute-Based User-Role Assignment' In: Proceedings of the 18th Annual Computer Security Applications Conference 2002, (10 pages).
Y.Zong et al. 'Trustworthiness Based Authorization on WWW' In: IEE Workshop on Security in Distributed Data Warehousing, New Orleans, Oct. 2001, CERIAS Tech Report 2002-2008, (6 pages).

* cited by examiner

*Primary Examiner* — Kambiz Zand
*Assistant Examiner* — Teshome Hailu
(74) *Attorney, Agent, or Firm* — Heslin Rothenberg Farley & Mesiti P.C.

(57) ABSTRACT

A method of dynamically assigning a role to a user in a distributed computing environment can comprise the steps of: defining one or more roles and their respective threshold trust values; defining one or more attributes and their respective weight coefficients; determining current values of the attributes for the user; calculating a current level of trust for the user, based on the attribute values and the weight coefficients; and assigning a role to the user based on the current level of trust and the threshold values.

20 Claims, 4 Drawing Sheets

ACTIVE ACCESS CONTROL SYSTEM AND METHOD

CROSS REFERENCE TO RELATED APPLICATIONS

This application claims priority under 35 U.S.C §119(e) of provisional application U.S. application No. 61/066,566, filed Feb. 21, 2008, entitled "ACTIVE ACCESS CONTROL SYSTEM AND METHOD," which is incorporated herein by reference in its entirety.

STATEMENT REGARDING FEDERALLY SPONSORED RESEARCH OR DEVELOPMENT

The disclosed invention was made with government support under a grant awarded by the United States Air Force under Grant No. FA8750-04-C-0287. The United States Government has certain rights in the invention.

FIELD OF THE INVENTION

This invention relates generally to controlling access to computing resources in a distributed computing environment, and more specifically to providing a method for active role-based access control to computing resources in a distributed computing environment.

BACKGROUND OF THE INVENTION

In distributed computing environments, users' privileges should be in synch with their current contexts in the enterprise: at any given time, the least privilege needed to accomplish a task should be assigned to a user. A conventional identity-based access control mechanism can suffice for applications accessed by a limited number of users with stable privilege assignments. However, the identity-based approaches are not scalable enough for distributed computing environments which support many users from different organizations.

Furthermore, access control methods known in the art use predefined sets of rules to make static access control decisions: once a set of privileges is assigned to a user, the user is typically allowed to use those privileges in different contexts within the enterprise. Thus, the known methods do not take into consideration the user's context change, but rather make access control decisions based upon the user's privileges upon log-on.

Thus, a need exists to provide an access control method to deal with core challenges in terms of context awareness, fine granularity, and scalability.

SUMMARY OF THE INVENTION

A method of dynamically assigning a role to a user in a distributed computing environment can comprise the steps of: defining one or more roles and their respective threshold trust values; defining one or more attributes and their respective weight coefficients; determining current values of the attributes for the user; calculating a current level of trust for the user, based on the attribute values and the weight coefficients; and assigning a role to the user based on the current level of trust and the threshold values.

BRIEF DESCRIPTION OF THE DRAWINGS

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is provided a system and a method of active access control (AAC) for users accessing a distributed computing environment comprising a plurality of computing resources. The computing resources can include, e.g., files, network-accessible storage (e.g., disk arrays attached to storage area networks), web services, and software applications. The computing environment can comprise one or more computers hosting the computing resources and interconnected via one or more networks. The computing environment can have a user registry storing user login credentials, including a unique user identifier and authentication information for each user. Each computing resource can have a set of permissions associated with it.

In accordance with the role-based access control (RBAC) approach, permissions to access a computing resource can be associated with one or more roles. A user can have one or more roles assigned to him or her, and thus acquire the permissions associated with the roles. Thus, a role can be associated with a set of permissions to access one or more computer resources, and can be assigned to zero or more users. The assignment of users to roles can be stored in a user role assignment database. In one embodiment, a user wishing to access a computing resource can pull his or her roles from the user role assignment database and present the roles to an entity controlling access to the computing resource. In another embodiment, a user wishing to access a computing resource can present his or her authentication information to an entity controlling access to the computing resource, and the access controlling entity can then pull the user role information from the user role assignment database.

In a distributed computing environment, a user's operational environment can be characterized by context and entity attributes. Entity attributes can include, e.g., attributes characterizing location, communication channel, access point, end-system and the user. Context attributes can include, e.g., attributes characterizing job relevance, vitality (i.e., active vs. idle state), frequency, mobility, and level of threat.

Upon successful authentication, a user can establish a working session with the distributed computing environment. During the session, which can be terminated by a logout event, the user may need to perform different tasks requiring access to various computing resources. Also during the same session, or from one session to another, the user's operational environment can dynamically change.

The AAC method can provide context-aware access control by dynamically changing user role among his or her assigned roles based on data elements provided by a plurality of distributed information sensors.

Figure 1:
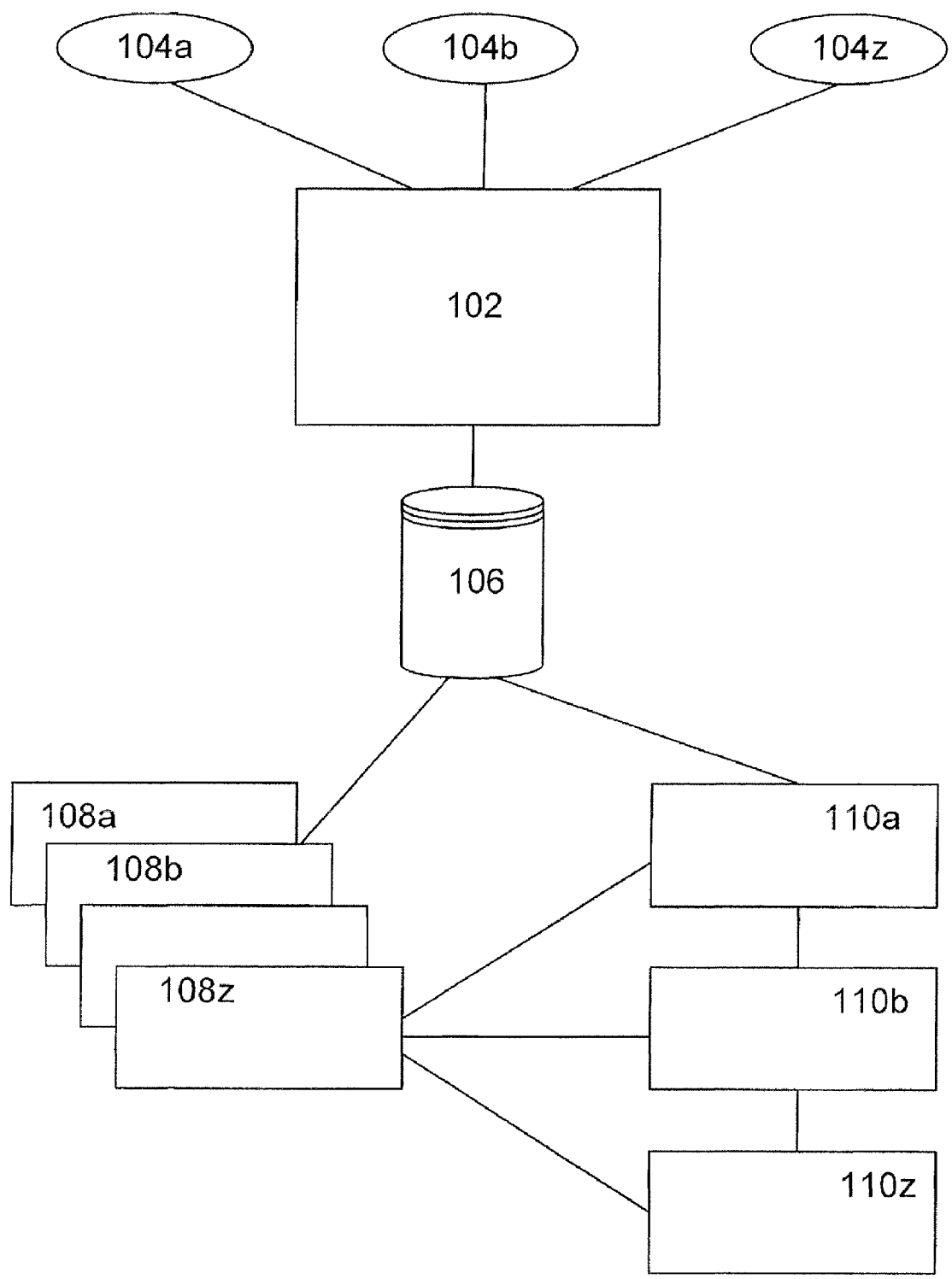
FIG. 1 illustrates a layout of one embodiment of the AAC system according to the present invention.

FIG. 1 illustrates a layout of a sample embodiment of the AAC system according to the present invention. AAC controller 102, which in one embodiment can be implemented as a software program executable by one or more computers, can receive a plurality of data elements representing one or more context and entity attributes from a plurality of sensors 104a-104z. An attribute can be described by one or more data elements. The sensors 104a-104z can include, e.g., zero or more intrusion detection system (IDS) sensors 104a, zero or more location sensors 104b, and zero or more log sensors 104z. A sensor can be implemented, e.g., as a software program executable by one or more computers, or as a specialized hardware component.

AAC controller 102 can be in communication with the active role server 106 which in one embodiment can be implemented as a software program executable by one or more computers. AAC controller 102 can process a plurality of data elements received from the sensors 104a-104z according to the AAC method of the present invention and transmit the current user role assignment information to the active role server 106. In one embodiment, the new user role assignment can be transmitted by the AAC controller 102 whenever processing the data elements received from the sensors 104a-104z resulted in updating a user role assignment. Users 108a-108z can access computing resources 110a-110z in accordance with the permissions associated with the users' roles retrieved from the active role server 104.

Figure 2:
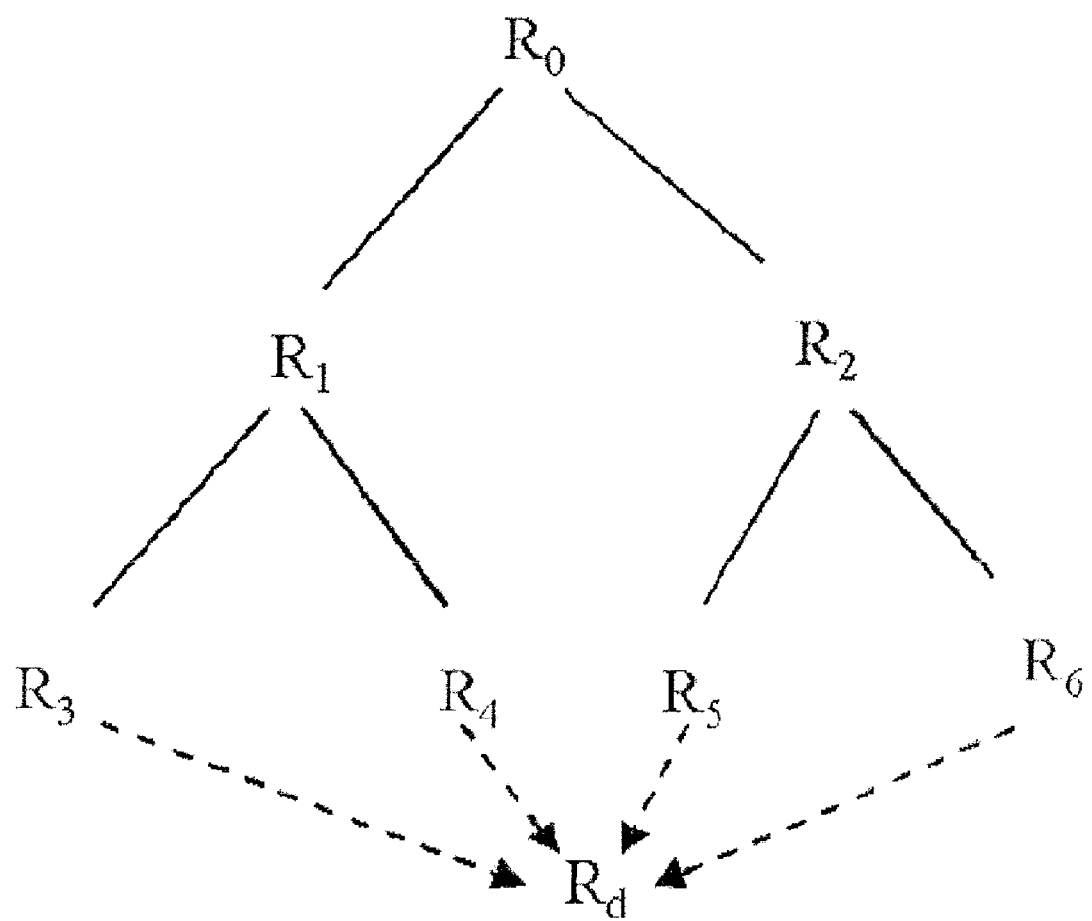
FIG. 2 illustrates an example of role hierarchy according to the present invention.

In one embodiment, the roles assigned to a user or potentially available for assignment to the user can form a hierarchical structure an example of which is shown in FIG. 2. Set of roles $R_i$ refers to all roles defined in a distributed computing environment, which in the example shown in FIG. 2 includes the following roles: $R_0$, $R_1$, $R_2$, $R_3$, $R_4$, $R_5$, $R_6$, and $R_d$.

Every user in the computing environment can be assigned to the default role referred to by the symbol $R_d$ in the example of FIG. 2. In one embodiment, the default role can be associated with the lowest set of permission in the computing environment.

A subset $R_a$ of available roles can include the roles available to a user. In one aspect, available roles can be determined, e.g., in accordance with an organizational policy. In another aspect, the user can never be assigned a role which is higher in the role hierarchy than the user's highest available role. In the example of FIG. 2, a user can be assigned one or more of the roles $R_1$, $R_3$, $R_4$, and $R_d$. A higher role in the hierarchy can inherit one or more subordinate roles. Therefore, in the example of FIG. 2, is a user is assigned to $R_1$, the user will also be automatically assigned to the subordinate roles $R_3$, $R_4$, and $R_d$.

A subset $R_c$ of assigned roles $R_a$ can be designated as the current roles for a user by the AAC controller. The user can access computing resources in accordance with the set of permissions associated with all his or her current roles. In the example of FIG. 2, the user's current roles $R_c$ include $R_3$, $R_4$, and $R_d$.

A set of roles that is required for the user to perform a given task is referred to by the symbol $R_q$. For a user to be able to perform a given task, the subset of his or her current roles must include the subset of required roles: $R_c \supset R_q$. In the example of FIG. 2, the subset $R_q$ is defined as including a single role $R_3$.

In one aspect, the role hierarchy can be characterized by the following relationships:

$$Ri \supseteq R_a \supseteq R_c \supseteq R_q \supseteq R_d.$$

Figure 3:
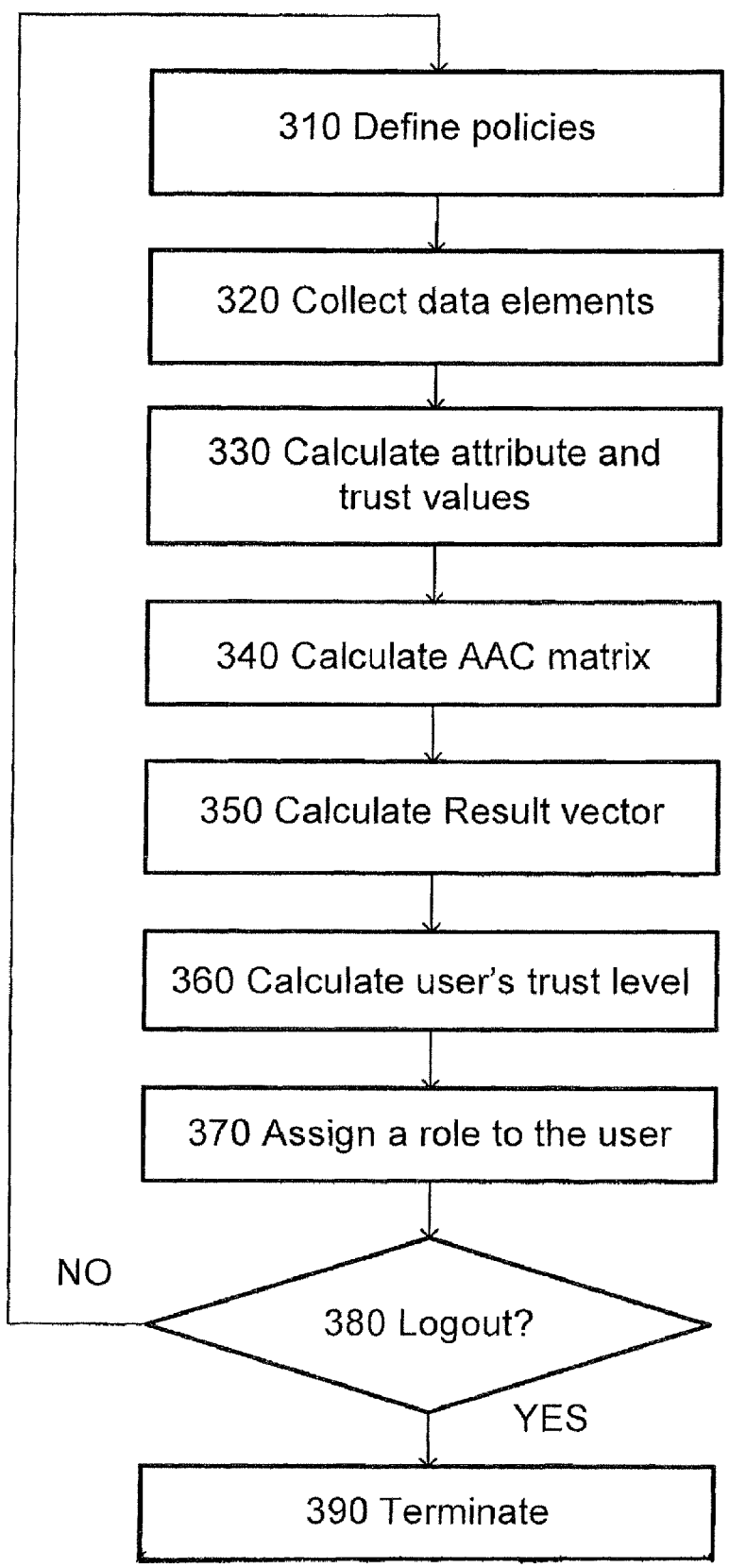
FIG. 3 illustrates a flowchart of one embodiment of the AAC method of the present invention.

AAC method of the present invention is now being described with reference to the flowchart of FIG. 3.

At step 310, the system-wide policies can be defined, including defining system-wide roles $R_i$, associating permissions to access computing resources with roles, and defining a subset of roles available to each user.

At step 320, a plurality of data elements can be received from one or more sensors. The data elements can define a plurality of current entity or context attributes. In one embodiment, the entity attributes can include Location, Communication, Access Point, End-System and the User.

At step 330, the attribute and trust values can be calculated. Each attribute can represent a trust level of the distributed computing environment to the corresponding aspect of the user's operational environment. For example, the Location attribute can represent the trust level of the current locations of the user, end-systems, and the service providers (e.g., application servers). The Communication attribute can represent the trust level of the current communication channel between the end-system and the service provider. The End-System attribute can represent the trust level of the user's terminal, based, e.g., on operating system (OS) vulnerabilities and maintenance status. The User attribute can represent the trust level of the user, based, e.g., on his or her previous activities and organizational policies.

The overall trust level for a given set of entity attributes can be calculated as follows:

$$T(e, w) = \sum_{i=1}^{n} e_i w_i$$

wherein $e_i$ is the trust level of i-th entity attribute, and $w_i$ is the weight of the i-th entity attribute.

In one embodiment, context attributes can include job relevance, vitality (i.e., active vs. idle state), frequency, mobility, and level of threat. For example, the Relevance attribute can represent the extent of the user's current activity being relevant to his or her assigned tasks. Although an initial role can be determined and assigned at the beginning of a work session, the level of Relevance can be decreased if the user participates in any non-task-related activities (e.g., issues irrelevant or malicious commands), which can result in changing the user's current role by the AAC controller. The Vitality attribute can represent whether the connection is active, idle, or sporadic. For example, a sensitive application may close the user's session if the connection is idle for a certain period. The Frequency attribute can represent the frequency of an activity performed by the user. The Mobility attribute can represent whether the user is moving from one location to another while his or her terminal is being connected to the network. The Threat attribute can represent the threat level of the current user's operational environment. For example, if a wireless access point is under a threat of an attack, the current users who are connecting to the access point should not be allowed to use highly sensitive privileges, even though their activities are otherwise legitimate.

The overall trust level for a given set of Context attributes can be calculated as follows:

$$T(c, u) = \sum_{j=1}^{m} c_j u_j$$

wherein $c_j$ is the trust level of j-th context attribute, and uj is the weight of the j-th context attribute.

At step 340, an AAC matrix can be calculated. In one embodiment, the AAC matrix can be constructed by grouping the entity and context attributes into the rows of the matrix. If the number of entity and context attributes are not equal, the empty cells can be filled with zero values:

$$AAC = \begin{vmatrix} e_1 e_2 & \ldots & e_n \\ c_1 c_2 & \ldots & c_m \end{vmatrix}$$

Thus, the AAC matrix can have dimensions of $2 \times \psi$, wherein v is the maximum of the numbers of entity and context attributes: $\psi = \max(m, n)$.

At step 350, the Result vector can be calculated. In one embodiment, a weight matrix can be constructed by grouping the weight coefficients of entity and context attributes into the rows of the matrix. If the number of entity and context attributes are not equal, the empty cells can be filled with zero values:

$$W = \begin{vmatrix} w_1 w_2 & \ldots & w_n \\ u_1 u_2 & \ldots & uw_m \end{vmatrix}$$

Thus, the weight matrix can have dimensions of $\psi \times 2$.

The Result vector can be calculated as the main diagonal of the product of the AAC matrix and weight matrix:

$$R = \text{diag}(AAC \times W) = [R_1, R_2]$$

At step 360, the trust level of the user's current operational environment can be calculated as the product of the Result vector and a vector of threshold coefficients:

$$r = R \times \begin{vmatrix} a \\ b \end{vmatrix} = \alpha R_1 + \beta R_2$$

wherein $0 \leq \alpha, \beta \leq 1$, and $\alpha + \beta = 1$.

At step 370, a new role can be assigned to the user based on the calculated trust value and pre-defined threshold values. In one embodiment, for each role $R_i$, a threshold value $\text{Thd}[R_i]$ of trust needed for a user to be assigned to the role, can be defined. Then, the current user's role can be determined as follows:

$$R_c = \begin{cases} R_i, & \text{if } r > \text{Thd}[R_i] \\ R_a, & \text{if } r > \text{Thd}[R_a] \\ R_q, & \text{if } r > \text{Thd}[R_q] \\ R_d & \text{otherwise} \end{cases}$$

At step 380, the method can conditionally, upon ascertaining that no logout events have occurred, loop back to step 320.

Figure 4:
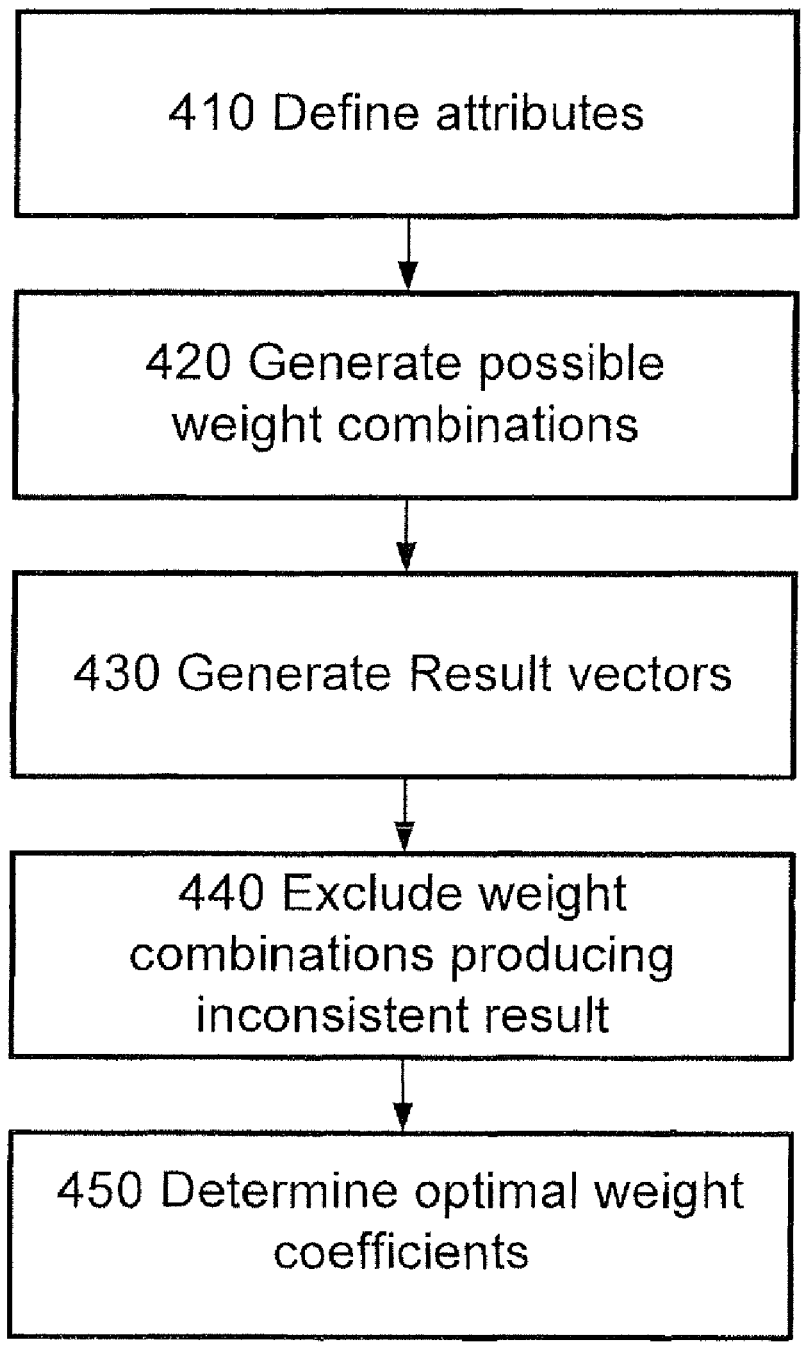
FIG. 4 illustrates a flowchart of one embodiment of the method of determining weight coefficients in accordance to the present invention.

A sample embodiment of a method of determining weight coefficients in accordance with the present invention is now being described with reference to the flowchart of FIG. 4. Weight values can be chosen as reflecting the priority order of the attributes, e.g., according to an organizational policy for a given application. For example, the Location attribute can be the most important attribute in one application for its access control decision, while the Communication attribute can be the most important attributed in another application.

At step 410, the set of attributes to be used for access control decisions can be determined. Entity attributes can include, e.g., attributes characterizing location, communication channel, access point, end-system and the user. Context attributes can include, e.g., attributes characterizing job relevance, vitality, frequency, mobility, and level of threat.

At step 420, the method can generate possible combination of weights as the Weight vector. If an organizational policy specifies priorities of particular attributes, then the combinations conflicting with the policies can be excluded. For example, if the Location attribute is the most critical attribute according to an organizational policy, the highest weight score can be assigned to the Location attribute, and the combinations in which the weight of the Location attribute is not equal to the highest weight score, can be excluded.

At step 430, each possible combination of the weight vector components generated at the previous step can be tested to ascertain whether it produces a Result vector which is consistent with pre-defined baseline scenarios and privilege inheritance. A pre-defined baseline scenario can prescribe which role should be activated as the current role for a user in a specific situation. A weight vector is inconsistent with privilege inheritance if it produces a higher trust level for a subordinate role than for the role which is higher in the role hierarchy.

At step 440, weight combinations producing Result vectors inconsistent with baseline scenarios or privilege inheritance are excluded.

At step 450, the optimal weight combination is determined. In one embodiment, the weigh vector which generates minimal trust values can be selected as the optimal, if the maximum level of privileges to the users needs to be provided. In another embodiment, where only the minimum level of privileges needs to be afforded to the users, the weight vector which generates maximal trust values. In a yet another embodiment, the weight vector which produces median trust values can be selected as the optimal.

A small sample of systems methods and apparatus that are described herein is as follows:

A1. A method of dynamically assigning a role to a user in a distributed computing environment, said method comprising the steps of:
defining one or more roles, each role characterized by a threshold trust value;
defining one or more attributes, each attribute characterized by a weight coefficient;
determining current values of said one or more attributes for said user;
calculating a current level of trust for said user, said current level of trust based on said values of said one or more attributes and said weight coefficients of said one or more attributes; and
assigning a role to said user based on said current level of trust and said threshold values.

A2. The method of claim A1, wherein said one or more attributes include at least one context attribute from the group consisting of: job relevance, vitality, frequency, mobility, and level of threat.

A3. The method of claim A1, wherein said one or more attributes include at least one entity attribute from the group consisting of: location, communication channel, access point, end-system and the user.

A4. The method of claim A1, wherein said role affords said user a minimum level of privileges needed to accomplish a task.

B1. A system for providing active access control (AAC) in a distributed computing environment, said system comprising:
   a plurality of information sensors;
   an AAC controller configured to receive a plurality of data elements from said plurality of information sensors, said plurality of data elements representing one or more attributes;
   an active role server in communication with said AAC controller;
   one or more users in communication with said active role server;
   one or more computing resources in communication with said active role server, said one or more computing resources configured to be accessed by said one or more users;
   wherein said AAC controller is configured to calculate a current level of trust for a user whishing to access said one or more computing resources, said current level of trust dependent upon said one or more data elements; and
   wherein said AAC controller is further configured to assign a role to said user based on said current level of trust, and to communicate said role to said active role server.

B2. The system of claim B1, wherein said one or more attributes include at least one context attribute from the group consisting of: job relevance, vitality, frequency, mobility, and level of threat.

B3. The system of claim B1, wherein said one or more attributes include at least one entity attribute from the group consisting of: location, communication channel, access point, end-system and the user.

B4. The system of claim B1, wherein said AAC controller is configured to communicate said role to said active role server responsive to ascertaining that processing said one or more data elements resulted in assigning a new role to said user.

While the present invention has been particularly shown and described with reference to certain exemplary embodiments, it will be understood by a skilled artisan that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

It will be further understood by a skilled artisan that in describing the embodiments of the present invention the term "user" refers to any entity accessing a particular computing resource, including human computer operators and software programs.

It will be further understood by a skilled artisan that the network topologies shown in the drawings and/or referred to in the detailed description of the present invention have been chosen for illustration purposes; any other network topologies providing the necessary connectivity between the components depicted in the drawings or described in the text, are understood to be within the scope of this invention. In particular, a "network" can include zero or more LANs, zero or more WANs, and zero or more VPNs, together with any packet switching and routing equipment necessary to establish the inter-network connectivity.

Further details of the above described embodiments are set forth in the manuscript by Joon S. Park, et al., titled *"Active Access Control with Fine-Granularity and Scalability"* which forms part of the present non-provisional application and which is presented as part of the text and drawings of provisional application U.S. Pat. application No. 61/066,566, which is incorporated herein by reference in its entirety.

The invention claimed is:

1. A method of dynamically assigning a role to a user in a distributed computing environment, said method comprising the steps of:
   a computer determining current values of one or more pre-defined attributes, each attribute of said one or more pre-defined attributes representing a trust level of said distributed computing environment to an aspect of an operational environment of said user;
   said computer calculating a current level of trust for said user, said current level of trust based on said current values of said one or more pre-defined attributes; and
   said computer assigning a role to said user based on said current level of trust and a pre-defined threshold value corresponding to said role;
   wherein said role belongs to a pre-defined hierarchical set of roles comprising a default role and one or more roles available to said user; and
   wherein said role is lower than or equal to a highest role available to said user in said hierarchical set of roles.

2. The method of claim 1, wherein said one or more pre-defined attributes include at least one context attribute from the group consisting of: job relevance, vitality, frequency, mobility, and level of threat.

3. The method of claim 1, wherein said one or more pre-defined attributes include at least one entity attribute from the group consisting of: location, communication channel, access point, end-system and the user.

4. The method of claim 1, wherein said role affords said user a minimum level of privileges needed to accomplish a task.

5. The method of claim 1, wherein said computer is configured to perform said step of determining current values of one or more pre-defined attributes based on a plurality of data elements received from a plurality of information sensors.

6. The method of claim 1, wherein said distributed computing environment comprises one or more computers hosting computing resources, said one or more computers interconnected by one or more networks.

7. The method of claim 1, wherein said distributed computing environment comprises one or more computers hosting one or more computing resources, said one or more computers interconnected by one or more networks; and
   wherein said one or more computing resources comprise at least one of: a file, a network-accessible storage, a web service, and a software application.

8. The method of claim 1, wherein said distributed computing environment comprises one or more computers hosting computing resources, each computing resource having a set of permissions associated with it.

9. The method of claim 1, wherein said role is associated with one or more permissions to access one or more computing resources.

10. The method of claim 1, further comprising the step of the computer, responsive to detecting a change in at least one value of said one or more pre-defined attributes, repeating said steps of calculating a current level of trust and assigning a role to said user.

11. The method of claim 1, wherein said pre-defined hierarchical set of roles comprises one or more roles available to said user;
   wherein said one or more roles available to said user comprise one or more current roles of said user;
   wherein said one or more current roles of said user comprise one or more roles required to perform a task; and
   wherein said one or more roles required to perform a task comprise said default role.

12. A system for providing active access control (AAC) in a distributed computing environment, said system comprising:
- a plurality of information sensors, each information sensor of said plurality of information sensors configured to return one or more data elements characterizing said distributed computing environment;
- an AAC controller program configured to receive a plurality of data elements from said plurality of information sensors, said plurality of data elements representing one or more pre-defined attributes, each attribute of said one or more pre-defined attributes representing a trust level of said distributed computing environment to an aspect of an operational environment of a user wishing to access said one or more computing resources;
- an active role server program in communication with said AAC controller, said active role server program configured to receive and transmit role assignment information for one or more users;
- one or more computing resources in communication with said active role server program, said one or more computing resources configured to be accessed by one or more users;
- wherein said AAC controller program is configured to calculate a current level of trust for said user, said current level of trust based on current values of said one or more pre-defined attributes; and
- wherein said AAC controller program is further configured to assign a role to said user based on said current level of trust, and to communicate said role to said active role server program.

13. The system of claim 12, wherein said one or more pre-defined attributes include at least one context attribute from the group consisting of: job relevance, vitality, frequency, mobility, and level of threat.

14. The system of claim 12, wherein said one or more pre-defined attributes include at least one entity attribute from the group consisting of: location, communication channel, access point, end-system and the user.

15. The system of claim 12, wherein said AAC controller program is configured to communicate said role to said active role server program responsive to ascertaining that processing said one or more data elements resulted in assigning a new role to said user.

16. The system of claim 12, wherein said distributed computing environment comprises one or more computers hosting computing resources, said one or more computers interconnected by one or more networks.

17. The system of claim 12, wherein said one or more computing resources comprise at least one of: a file, a network-accessible storage, a web service, and a software application.

18. The system of claim 12, wherein each computing resource of said one or more computing resources has a set of permissions associated with it.

19. The system of claim 12, wherein said role is associated with one or more permissions to access one or more computing resources.

20. The system of claim 12, wherein said AAC controller program is configured to calculate a new level of trust for said user responsive to receiving one or more new data elements from said plurality of information sensors; and
- wherein said AAC controller program is further configured to dynamically assign a new role to said user based on said new level of trust, and to communicate said new role to said active role server program.

* * * * *